United States Patent
Rosati et al.

(10) Patent No.: US 12,496,373 B2
(45) Date of Patent: Dec. 16, 2025

(54) PROCESS OF ENZYMATIC DEGRADATION OF AN ABSORBENT STRUCTURE FOR A HYGIENE ARTICLE

(71) Applicant: The Procter & Gamble Company, Cincinnati, OH (US)

(72) Inventors: Rodrigo Rosati, Frankfurt (DE); Jose Carlos Garciagarcia, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 718 days.

(21) Appl. No.: 17/951,153

(22) Filed: Sep. 23, 2022

(65) Prior Publication Data

US 2023/0113845 A1    Apr. 13, 2023

(51) Int. Cl.
*A61L 15/38* (2006.01)
*A61L 15/62* (2006.01)
*C12N 9/24* (2006.01)
*C12N 9/26* (2006.01)

(52) U.S. Cl.
CPC .............. *A61L 15/38* (2013.01); *A61L 15/62* (2013.01); *C12N 9/2402* (2013.01); *C12N 9/2411* (2013.01)

(58) Field of Classification Search
CPC .......... A61L 15/38; A61L 15/53; A61L 15/60; A61L 15/62; A61F 13/53; A61F 13/8405; A61F 2013/2438; A61F 2013/8441; B09B 3/60; B09B 2101/67; C12N 9/2402; C12N 9/2411
See application file for complete search history.

(56) References Cited

U.S. PATENT DOCUMENTS

| | | | | |
|---|---|---|---|---|
| 5,326,477 A | * | 7/1994 | Fugua | B03B 9/061 435/816 |
| 2019/0111176 A1 | * | 4/2019 | Serna | A61L 15/60 |
| 2019/0271018 A1 | * | 9/2019 | Konishi | C12P 19/14 |
| 2021/0290452 A1 | | 9/2021 | Chan et al. | |

FOREIGN PATENT DOCUMENTS

| | | | |
|---|---|---|---|
| EP | 0674920 A1 | | 10/1995 |
| EP | 3495490 A1 | | 6/2019 |
| JP | 2001212899 A | * | 8/2001 |
| JP | 2005245703 A | * | 9/2005 |
| WO | 2017015242 A1 | | 1/2017 |

OTHER PUBLICATIONS

Extended EP Search Report and Written Opinion for 22197273.0 dated Feb. 20, 2023, 07 pages.
Extended EP Search Report and Written Opinion for 21200716.5 dated Mar. 24, 2022, 05 pages.
PCT Search Report and Written Opinion for PCT/US2022/077217 dated Dec. 20, 2022,10 pages.

* cited by examiner

*Primary Examiner* — Philip R Wiest
(74) *Attorney, Agent, or Firm* — Amanda Herman Berghauer

(57) ABSTRACT

The present invention relates to a process of enzymatic degradation of an absorbent structure, the absorbent structure being suitable for providing an absorbent core of a hygiene article, wherein the process comprises the step of contacting the absorbent structure with a solution comprising enzymes; wherein the absorbent structure comprises a polysaccharide superabsorbent polymer, such as a cellulose-based or a starch-based superabsorbent polymer.

14 Claims, 8 Drawing Sheets

PROCESS OF ENZYMATIC DEGRADATION OF AN ABSORBENT STRUCTURE FOR A HYGIENE ARTICLE

FIELD OF THE INVENTION

The present invention relates to a process of enzymatic degradation of an absorbent structure, the absorbent structure being suitable for providing an absorbent core for a hygiene article to avoid the need to send the used absorbent structures to landfill.

BACKGROUND OF THE INVENTION

Currently most disposable diapers are made of substantial proportions of materials derived from petroleum, such as polypropylene and/or polyethylene. These materials often appear in the form of spun fibers forming cloth-like nonwoven web materials, or alternatively or in addition, films. In recent years concerns have arisen concerning the "environmental footprint" of human activities of all kinds. The manufacture and use of diapers is no exception, particularly in view of the growing human population, i.e., the growing number of babies. Most disposable diapers typically are not re-used or recycled, and many are disposed of after use in landfill. An alternative is reusable cloth diapers. However use of cloth diapers demands use of energy (e.g., for operating equipment, heating laundry water, and treating wastewater) and chemicals (e.g., detergents and water treatment agents), necessary for laundering soiled diapers at the rate they are typically used, and treating the associated wastewater, present their own set of stresses on the environment.

Several designs of diapers that include a reusable cloth outer cover and either a reusable or a disposable absorbent insert have been manufactured and marketed. However, disposable absorbent inserts generally are not flushable and would block domestic pipes and sewage systems if flushed into a toilet. So, for the user, these designs have still presented at least some of the disadvantages of traditional cloth diapers, while not providing some of the advantages available from current disposable diaper designs.

It would be beneficial to provide a process for degrading an absorbent structure, preferably a soiled absorbent structure after use, that could be readily disposed whilst avoiding the need to send the used absorbent structures to landfill.

SUMMARY OF THE INVENTION

The present invention relates to a process of enzymatic degradation of an absorbent structure, the absorbent structure being suitable for providing an absorbent core of a hygiene article, wherein the process comprises the step of contacting the absorbent structure with a solution comprising enzymes; wherein the absorbent structure comprises a polysaccharide superabsorbent polymer, such as a cellulose-based or a starch-based superabsorbent polymer.

DETAILED DESCRIPTION OF THE INVENTION

Figure 1A:
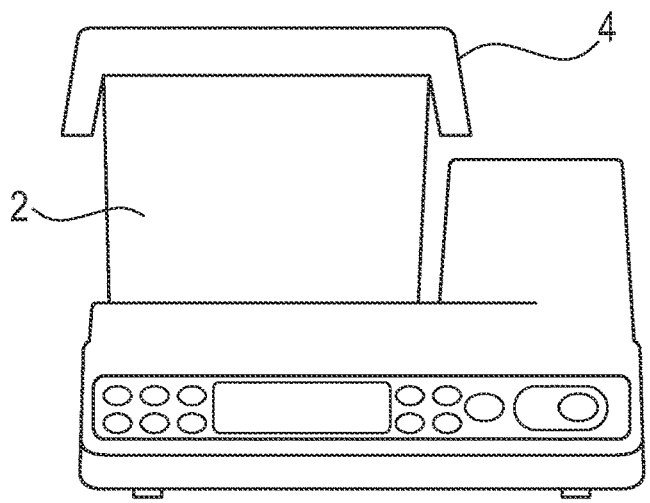
FIG. 1A is a front view of an apparatus suitable for use in the present invention.

The present invention relates to a process of enzymatic degradation of an absorbent structure, the absorbent structure being suitable for providing an absorbent core of a hygiene article.

The absorbent structure comprises superabsorbent polymer, optionally in combination with cellulosic fibres, for example wood pulp and other plant-based fibres.

The term "superabsorbent polymer" (herein abbreviated as "SAP" in the singular and plural form) typically refers to absorbent materials that can absorb at least 7 times, and preferably at least 10 times, their weight of an aqueous 0.9% saline solution as measured using the Centrifuge Retention Capacity (CRC) test (EDANA method NWSP 241.0.R2 (19)), referred herein as capacity. SAP are water-insoluble but water-swellable cross-linked polymers capable of absorbing large quantities of fluids. Most commonly, conventional SAP are polyacrylate polymers, however polyacrylate polymers are generally difficult to reduce by enzymatic degradation.

Accordingly, for the purposes of the present invention, preferred SAP are polysaccharide polymers and derivatives of polysaccharide polymers, such as polymers based on cellulose or starch. A polysaccharide is a carbohydrate that can be decomposed by hydrolysis into two or more molecules of monosaccharides. Polymers suitable for use as SAP include cellulose-based polymers such as carboxymethylcellulose. An example is Spongel®, manufactured by Magic S.r.L, Oleggio, Italy. Spongel® is mainly a cellulose-based material, cross-linked and/or reinforced by naturally derived inorganic fillers. Suitable starch-based superabsorbent polymers and methods for their synthesis are described in DE 19619680, published on Nov. 20 1997.

The polysaccharide SAP may be degraded by glycose hydrolase. For example, cellulose-based absorbent polymer such as carboxymethylcellulose, including cross-linked carboxymethylcellulose, may be degraded by cellulase. Starch-based particulate absorbent polymer material may be degraded by amylase.

Other suitable polysaccharides include polyalginates and carrageenan which may be degraded by alginate lyase and carrageenase, respectively. Carrageenan is a generic description of a group of sulphated polysaccharides. Different polysaccharide SAP may be used in combination.

Preferably, the cellulases are selected from cellulases, β-glucosidases and hemicellulase. For example, cellulase can be selected from endo-1,4-glucanase, exo-1,4-glucanase I and II, and β-glucosidase. Without wishing to be bound by theory, firstly, the 1,4-glycosidic linkage of cellulose may be broken down by endocellulase (e.g. endo-1,4-glucanase). The cellulose chain may then be further cleaved by exo-1, 4-glucanase to produce cellobiose molecules which are then hydrolyzed by glucosidase to release two monomeric carbohydrate units.

The cellulase enzymes are preferably provided as a solution dissolved in water. The enzyme solution may further comprise a pH buffer, such as sodium citrate, citrate-phosphate, acetate or phosphate to control pH in the range recommended for the specific enzyme or enzyme blend of interest.

A suitable cellulase enzyme blend is commercially available from Millipore-Sigma under the name Cellulase, enzyme blend, Catalogue No. SAE0020-50ML. The optimal pH range is from 3.8 to 6.5, preferably from 4.5 to 5.5. A suitable pH buffer concentration is 50 mM. An example of cellulase is fungal β-glucan-hydrolase. An example of pH buffer is 50 mM sodium citrate buffer pH 5. A specific pH buffering may be needed in case the used absorbent article contain mix of bodily matter such as urine and faecal material, which can lead to the production of pH-altering metabolites such as ammonia: for these case it may be preferred to use a pH buffer with molarity higher than 100 mM, more preferably higher than 200 mM, even more preferably higher than 250 mM.

The enzyme solution may comprise different type of enzymes. Optionally the enzyme solution may also comprise different types of degradation enhancing actives, such as peroxides.

While the process of the present invention may be carried out on an industrial scale, it is foreseen that the process is particularly suited to be carried out at a relatively smaller scale, such as a community or a domestic scale. For example, the process may be carried out in a maternity care facility; a nursery or other child care facility; or in domestic homes. The process provides the means to dispose of absorbent articles without the complexity of sorting and collection systems that are required for large-scale reprocessing of used absorbent articles. It is a preferred embodiment of the present invention that once the absorbent structure is at least partly liquified by contacting with the enzymatic solution, the liquified waste may then be discharged, preferably into a municipal sewage system, where the liquified waste can be accepted and readily dealt with in the same manner as sewage is conventionally processed.

Figure 1B:
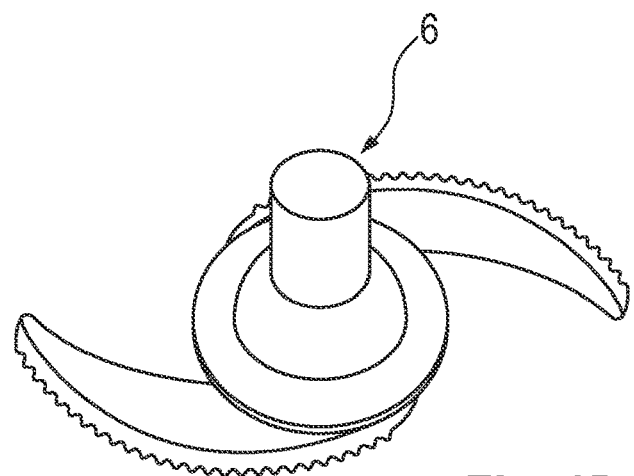
FIG. 1B is a perspective view of a rotating blade associated with the apparatus of FIG. 1A.

An apparatus suitable for the process of the present invention is shown in FIG. 1A. The apparatus comprises a collection unit illustrated in FIG. 1A as a container 2 with a lid 4. A rotating blade mechanism 6 is provided within the container 2. An enlarged and more detailed view of a blade mechanism is shown in FIG. 1B.

According to the process of the present invention, one or more absorbent structures are loaded into the drum. The absorbent structures may be absorbent cores or diaper "inserts" as described in more detail below. According to the process it is intended that the absorbent structures have been used and therefore contain urine, faecal material and other bodily fluids. A solution comprising enzymes is added to the absorbent structure(s) in the container 2 and the container is closed by means of the lid 4. The absorbent structure(s) is/are then degraded by the enzymes in the solution and optionally, mechanically reduced by stirring and/or cutting action of the rotating blade mechanism 6. The process may be programmed to turn on and off the blade mechanism as needed. The process may also be programmed to control the temperature of the enzymatic solution as needed.

The process may require several hours to degrade and liquify the absorbent structure(s) to a sufficient degree that allows disposal in the municipal sewage system. The process may take at least 2 hours, at least 4 hours, at least 8 hours or at least 12 hours.

As shown in FIG. 1A, the apparatus may comprise a closable chamber such as container 2 and lid 4. The lid 4 can be attached and detached from the container 2. The chamber should be closed during operation for several reasons: 1) the lid will avoid spillage of the content of the chamber, 2) the closed chamber will avoid accidental contact of children, people or domestic pets with the liquid and soiled diapers contained in the chamber, 3) the lid will limit the heat dispersion and evaporation of water which is needed for the efficient degradation activity carried by the enzymes on the absorbent structure materials, 4) the lid will limit the emission of bad odors from the used absorbent structure.

As shown in FIG. 1B, the rotating element 6 may be a sharp blade to facilitate the tearing and shredding of the used absorbent structure and the mixing of the used absorbent structures with the enzyme solution: increasing the contact of the used absorbent structures with the enzyme solution may improve the enzyme activity to degrade the used absorbent structures. The rotating element 6 may also be a mixing element or blade without a sharp cutting edge. The rotating element 6 is connected to a rotating shaft, which is connected to a motor. The rotating element and rotating shaft may also not be present. The apparatus may be provided with an interface such as an operating panel to allow the user to switch on/off the equipment and to set operating conditions, such as the temperature, the rotating speed and the treatment duration time. The container 2 may be detachable from the apparatus to simplify the emptying and cleaning of the container 2 by the user.

It may also be possible to program the equipment to follow a specific rotation speed as function of time, for example it may be preferred to use a larger rotation speed in the first 5 or 10 or 20 or 30 or 60 minutes, then use a lower speed for the rest of the duration of the treatment. The larger rotation speed may be preferable at the beginning to facilitate the shredding of the used absorbent articles. The rotating speed may be in the range of 50 up 10000 rpm, for example it may be in the range between 100 and 1000 rpm. Too low speed may not be sufficient to shred the used absorbent articles. Too high speed will consume higher energy and may lead to air entrapment and foam formation which may decrease enzyme activity. Antifoam agents may be added to the enzyme solution to prevent or at least reduce foam formation.

In a specific embodiment, the container 2 may itself be rotatable by means of a motor. In this case the container may not be provided with the rotating element, as the agitation is provided by the rotating of the chamber itself.

The apparatus may also be provided with a heating system and temperature controlling system to control the temperature of the enzyme solution contained in the container 2. There may be an optimal temperature for the optimal activity of the enzymes. Too low temperatures may result into low enzymatic activity, while too high temperature may result into irreversible degradation and inactivation of the enzymes. The optimal temperature may be in the range between about 15 and about 80° C., preferably in the range between about 40 and about 60° C. The optimal operating temperature depends on the specific used enzymes, as indicated for example by the enzyme manufacturer. It may be possible to program the equipment to follow a specific temperature as function of time, for example it may be preferred to use a lower temperature for a first duration time needed to dissolve the used absorbent articles by the enzyme solution, then use a higher temperature for a second duration time; the higher temperature treatment for a second duration time may be needed to sterilize or reduce the live bacteria concentration in the slurry, if that slurry has to be disposed for example in a composter or in the open environment. An additional benefit of using a specific temperature as function of time may be to use a lower temperature for a first duration time needed to optimize the activity of a first enzyme type, which is optimal at the first temperature, then use a higher temperature for a second duration time, needed to optimize the activity of a second enzyme type, which is optimal at the second temperature.

Figure 2:
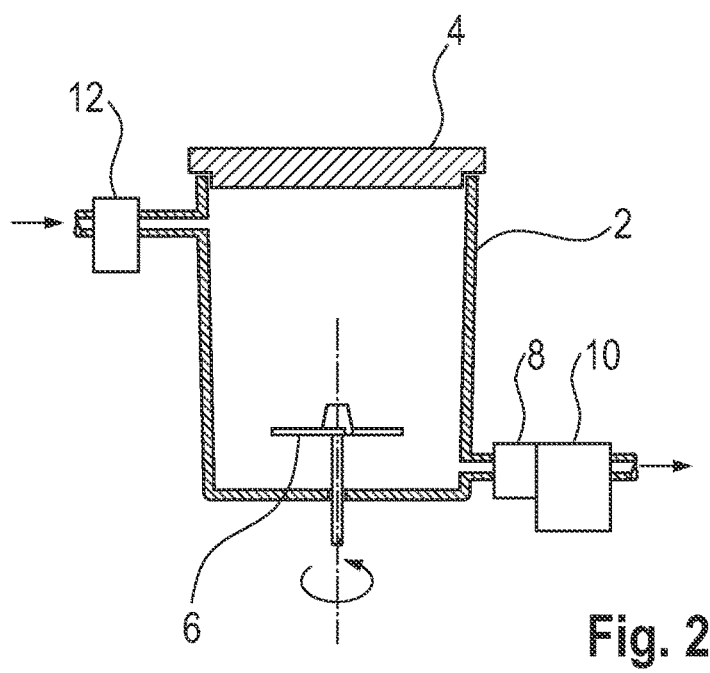
FIG. 2 is a schematic cross-section of the apparatus shown in FIG. 1A.

As shown in FIG. 2, the treatment apparatus may be provided with a filter 8, pump 10 and an exit to empty the container. The container 2 can be opened and closed by means of lid 4, which can be attached and detached from the container 2. The used absorbent structures are loaded inside the container 2. The rotating element 6 is connected to a rotating shaft, driven by a motor. The container 2 may have an exit, connected to a pump 10. The pump 10, at the end of the treatment, may expel the solution via the exit, to a sink available in the location where the treatment apparatus is located. The sink may be attached to the grey water or black water system of the location. The exit may be provided with a filter 8 to filter out undegraded parts of the used absorbent articles, for example larger than a given dimension. The pump may be operated manually via the panel or automatically programmed in the apparatus. Also the cleaning procedure may be performed via simply loading water with optionally a chemical to perform the cleaning and then empty the container 2 via the pump 10. The container 2 may be provided with an inlet for the automatic supply of water, by an amount metered by a pump 12. The water may already contain the enzyme and/or the pH buffer. Alternatively the enzyme and/or pH buffer may loaded directly into the container 2 while loading the used absorbent articles via opening the lid 4. The pump 10 may be used to circulate the fluid in the chamber via pumping it back through a separate inlet thus providing fluid agitation. Fluid agitation may also be achieved by multiple inlets connected to the pumps 10 and/or 12, creating multiple jets of fluid.

The enzyme solution is added to contact the used absorbent structures in the treatment apparatus. The weight ratio of used absorbent structures to enzyme solution may preferably be in a ratio of 1:1 to 1:100, more preferably from 1:10 to 1:50. For example if one dry absorbent structure is known to have a mass of 30 g, 300 g of solution may be added.

Another parameter is the amount of actual enzyme added via the enzyme solution. A representative ratio of the amount of enzyme per gram of dry absorbent structures material is preferably in the range of 0.001 to 10 g of enzyme per g of dry absorbent structures material, more preferably in the range 0.1 to 1 g of enzyme per g of dry absorbent structures material.

In the following description the absorbent structures are described with reference to "absorbent inserts". Absorbent inserts may be suitable for use in hybrid incontinence articles wherein the disposable absorbent insert is used in combination with a reuseable, washable outer cover, such as a cloth outer cover. Examples of features of suitable absorbent inserts 50 will be described with reference to FIGS. 3, 4 and 5A-G.

Figure 3:
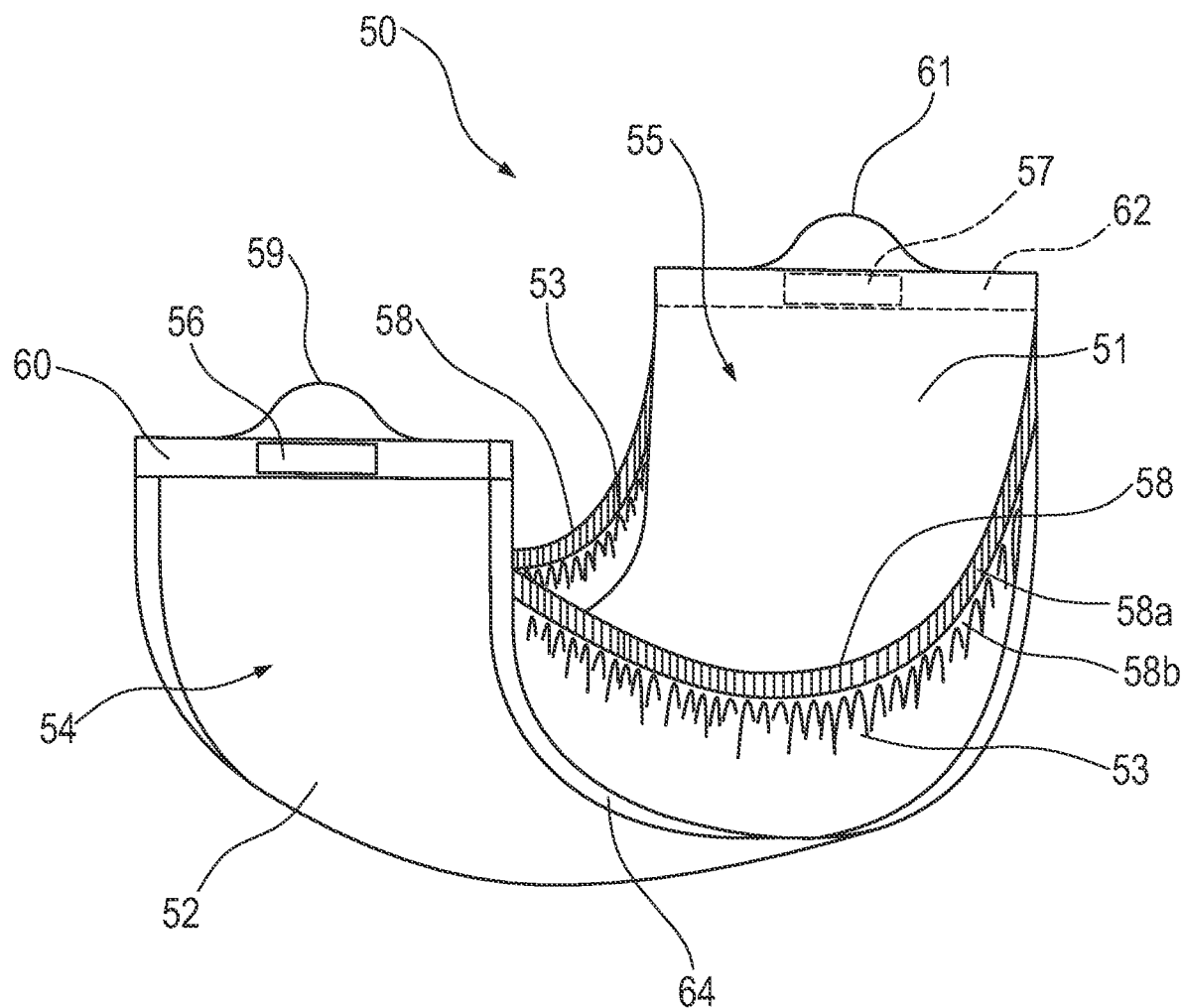
FIG. 3 is a perspective view of a disposable absorbent insert shown apart from an outer cover, as it might appear in a free-standing, relaxed state.
Figure 4:
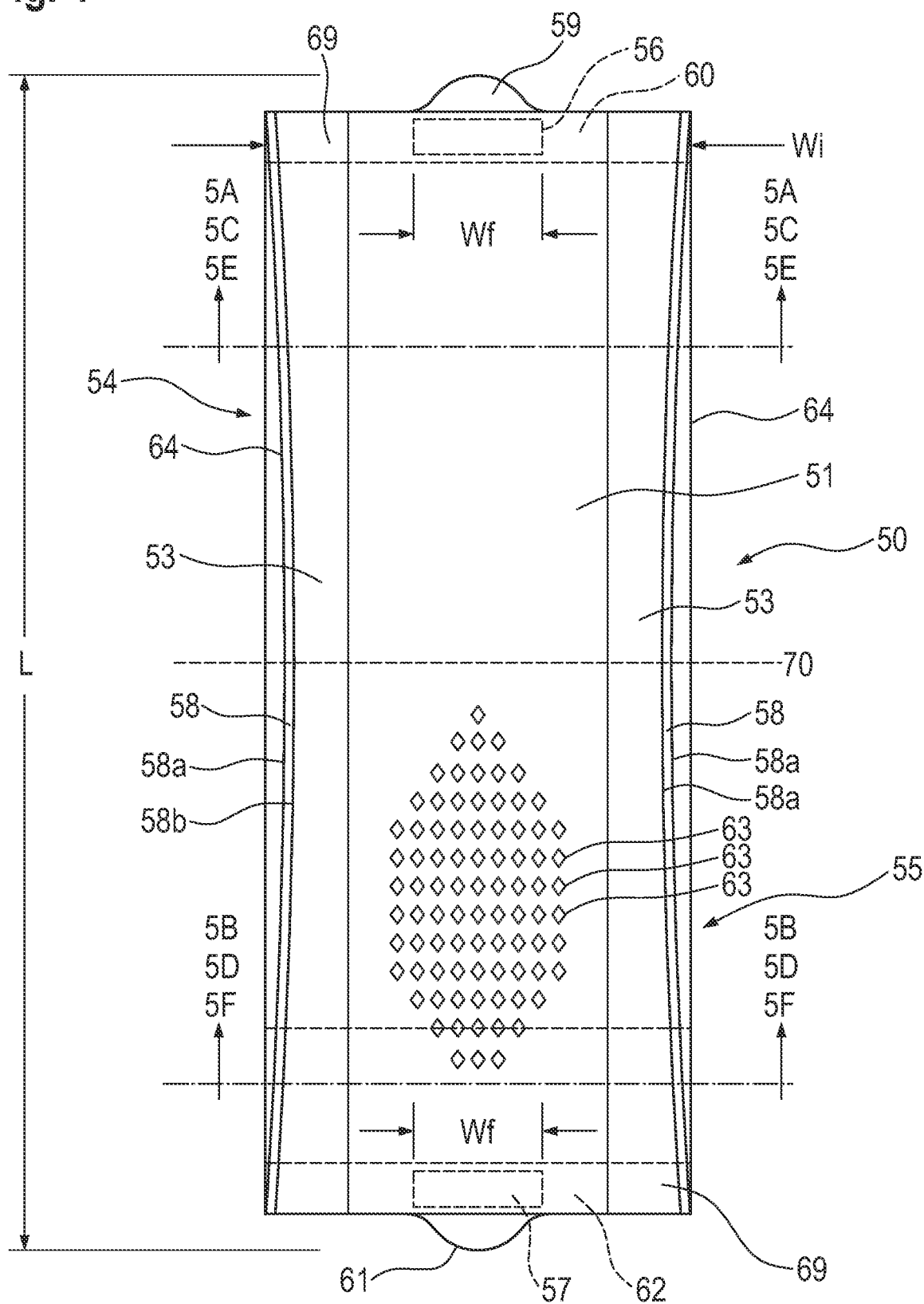
FIG. 4 is a plan view of a disposable absorbent insert shown stretched out and laid flat, body-facing surfaces facing the viewer.

FIG. 3 depicts a disposable absorbent insert 50 that may form an inner component of a wearable absorbent article as described herein, shown in perspective view as it might appear in a free-standing apart from an outer cover. FIG. 4 depicts an example of an insert 50 shown stretched out and laid flat, body-facing surfaces facing the viewer. FIGS. 5A-5G depict cross sections of an insert 50 as indicated in FIG. 4, in various possible examples.

Insert 50 may have a topsheet 51 and backsheet 52 forming an envelope-like enclosure for absorbent structures such as those described further below. The absorbent structures, described with reference to absorbent inserts, comprise topsheet 51 and backsheet 52. Topsheet 51 and backsheet 52 may be affixed together along longitudinal seams 64, and along lateral seams 69.

Topsheet

Topsheet 51 may be formed of a liquid-permeable non-woven web material. It may be desired that material forming topsheet 51 is compliant, soft-feeling, and non-irritating to the wearer's skin. It may be desired that at least a portion of topsheet 51 may be liquid pervious, permitting liquids to readily penetrate through its thickness. A suitable topsheet may be manufactured from a wide range of biodegradable materials, such as woven or nonwoven materials of natural fibers (e.g. softwood pulp, hardwood pulp, cotton, bamboo pulp, abaca pulp, viscose, Lyocell, hemp, flax, kapok, kenaf, jute, cupro, ramie, sisal, etc.). If topsheet 51 includes fibers, the fibers may be spunbond, carded, wet-laid, meltblown, hydroentangled, or otherwise processed as is known in the art. Preferred fiber for the topsheet 51 and backsheet 52 is viscose, pulp and blends of viscose and pulp. Even more preferred is a viscose fiber with flat cross-sectional shape such that average fiber thickness is smaller than 7 micrometers, e.g. Viloft viscose fibers commercially available from Kelheim Fibers GmbH. Another preferred embodiment for the topsheet 51 may be a spunlace made of a mix of viscose and pulp. Without being bound by theory, it is believed that the enzymatic dissolution of the fibers depends on multiple factors, such as the thickness of the fibers, the crystallinity of the polymer constituting the fibers, the type of treatment the natural fibers are subjected to. For example natural fibers, containing hemicellulose polymer, may be easier to dissolve. For example fibers with thinner thickness may be easier to dissolve as they offer larger specific surface area to the enzymes to contact the fibers, degrade the polymers and weaken the mechanical stability of the fibers. For example fibers with higher content of lignin may be more difficult to degrade. For example pulp fibers or viscose fibers made from dissolving wood pulp with sulfite process may be easier to be degraded by the enzymes vs. pulp fibers or viscose fibers made from dissolving wood pulp which were treated with sulfate or kraft process.

In some circumstances it may be desired that at least a portion of topsheet 51 is made of a hydrophobic material or is treated to be hydrophobic in order to isolate the wearer's skin from liquids contained in absorbent core 71. A suitable hydrophobic cellulosic fiber is, for example, a viscose fiber with a hydrophobic additive, such as Olea fiber, commercially available from Kelheim Fibres GmbH. If topsheet 51 is generally made of a hydrophobic material, it may be desired that at least a portion of the upper surface of topsheet 51 is treated to be hydrophilic so that liquids will transfer through the topsheet more rapidly. Topsheet 51 can be rendered hydrophilic by treating it with a surfactant or by incorporating a surfactant into the topsheet. Suitable methods for treating topsheet 51 with a surfactant include spraying the topsheet material with the surfactant and/or immersing the material into the surfactant. A more detailed discussion of such a treatment and hydrophilicity is contained in U.S. Pat. Nos. 4,988,344 and 4,988,345. A more detailed discussion of some suitable methods for incorporating a surfactant in the topsheet can be found in U.S. Statutory Invention Registration No. H1670. In another example, however, topsheet 51 may include an apertured web which is hydrophobic. This may be accomplished by foregoing the hydrophilizing treatment step from the production process and/or applying a hydrophobic treatment to the topsheet material, such as a polytetraflouroethylene compound like SCOTCHGUARD or a hydrophobic lotion composition, as described below. In such examples, it may be desired that the apertures be large enough to allow the penetration of aqueous fluids like urine without significant resistance otherwise attributable to hydrophobicity. It may also be desired that the apertures have sufficient effective open area and/or aperture size to allow the penetration of low-viscosity fecal material. Examples of topsheets meeting these requirements are described in U.S. Pat. Nos. 5,342,338; 6,414,215; and 6,010,491. Alternatively the hydrophobic and hydrophilic fibers can be mixed in the topsheet 51 to allow fast acquisition with reduced fluid retention. For example hydrophobic viscose fibers and hydrophilic viscose fibers may be blended in ratios such from 10:90 to 90:10, depending on the level of hydrophilicity and hydrophobicity of those fibers. Level of hydrophilicity and hydrophobicity can be determined via water contact angle.

Any portion of topsheet 51 may be coated with a lotion or skin care composition as is known in the art. Examples of suitable lotions include those described in U.S. Pat. Nos. 5,607,760; 5,609,587; 5,635,191; 5,643,588; 5,968,025 and 6,716,441. The lotion may function alone or in combination with another agent as the hydrophobizing treatment described above. The lotion and hydrophobizing treatment may be biodegradable.

Topsheet 51 may also include or be treated with antibacterial agents, some examples of which are disclosed in U.S. application Ser. No. 08/212,441, published as U.S. Statutory Invention Registration H1732.

Topsheet 51, backsheet 52 or any portion of the topsheet or backsheet may be embossed and/or matte finished to provide a more cloth-like appearance.

Backsheet

Backsheet 52 is generally that outer liner portion of insert 50 forming the garment-facing surface thereof, and prevents the exudates absorbed and contained within insert 50 from wicking through and soiling the outer cover. In some circumstances it may be desired that backsheet 52 is substantially impervious to liquids.

Backsheet 52 may be formed of a substantially liquid impermeable nonwoven web, so as to contain and isolate liquid exudates from the outer cover, outer clothing and/or environment of the wearer. At the same time, backsheet 52 may be vapor permeable to provide for breathability of the insert and the wearable absorbent article, reducing humidity in the areas between the insert and the wearer's body, and helping reduce the likelihood of skin irritation and/or rashes that may result from over-hydration of the skin. Alternatively the backsheet 52 may be an hydrophilic nonwoven, however it would require a liquid impermeable material to be built in the washable reusable cover.

In certain embodiments, the backsheet may have a water vapor transmission rate (WVTR) of greater than about 2000 g/24 h/m2, greater than about 3000 g/24 h/m2, greater than about 5000 g/24 h/m2, greater than about 6000 g/24 h/m2, greater than about 7000 g/24 h/m2, greater than about 8000 g/24 h/m2, greater than about 9000 g/24 h/m2, greater than about 10000 g/24 h/m2, greater than about 11000 g/24 h/m2, greater than about 12000 g/24 h/m2, greater than about 15000 g/24 h/m2, measured according to WSP 70.5 (08) at 37.8° C. and 60% Relative Humidity. A higher WVTR may be desired in this particular application, since the insert backsheet 52 will not form the outer surface of the wearable article, as a conventional disposable diaper backsheet would, but rather, will be covered by the one or more layers of the outer cover material(s)—which themselves may act in some circumstances to reduce WVTR of the composite structure.

Backsheet 52 may be joined to topsheet 51, absorbent core 71 or any other element of insert 50 by any suitable attachment mechanism known in the art. For example, the attachment mechanism may include a continuous line or layer of adhesive, a patterned layer of adhesive, or an array of separate lines, spirals, or spots of adhesive. One example of an attachment mechanism comprises an open pattern network of filaments of adhesive as disclosed in U.S. Pat. No. 4,573,986. Other suitable attachment mechanisms include several lines of adhesive filaments which are swirled into a spiral pattern, as is illustrated by the apparatus and methods shown in U.S. Pat. Nos. 3,911,173; 4,785,996; and 4,842,666.

At the processing temperature in the treatment apparatus, the presence of adhesives in absorbent articles may lead to the issue of the formation of a glutinous aggregation. Such glutinous aggregations tend to stick to the shaft and blade system in the treatment apparatus and significantly increases the dissolution time of the used absorbent structures. In order to address this issue, it is preferred that some, or preferably all, of the adhesive used in absorbent articles has a storage modulus, G', which is higher than 300,000 Pa, as measured at 1 Hz frequency according to the Oscillatory Rheometry Test Method described herein. It is most preferable to use adhesives having a storage modulus G', measured at 1 Hz, higher than 300,000 Pa when measured at 50° C.

Without wishing to be bound to theory, it is believed that an adhesive with a storage modulus G', measured at 1 Hz, higher than 300,000 Pa at the processing temperature in the treatment apparatus will be less sticky, therefore reducing the effect of binding residual fibers together and adhering to parts of the treatment apparatus. This finding being consistent with Dahlquist's criterion. Given that the treatment apparatus will be cooled down to about room temperature, it may be preferable to use an adhesive with a storage modulus G', measured at 1 Hz, higher than 300,000 Pa within the temperature range between environmental temperature where the treatment apparatus is used and the operating temperature of the treatment apparatus, for example from 20° C. to 50° C. The storage modulus G' in the temperature range between environmental temperature where the treatment apparatus is used and the operating temperature of the treatment apparatus may be lower than 10,000,000 Pa.

Figure 6:
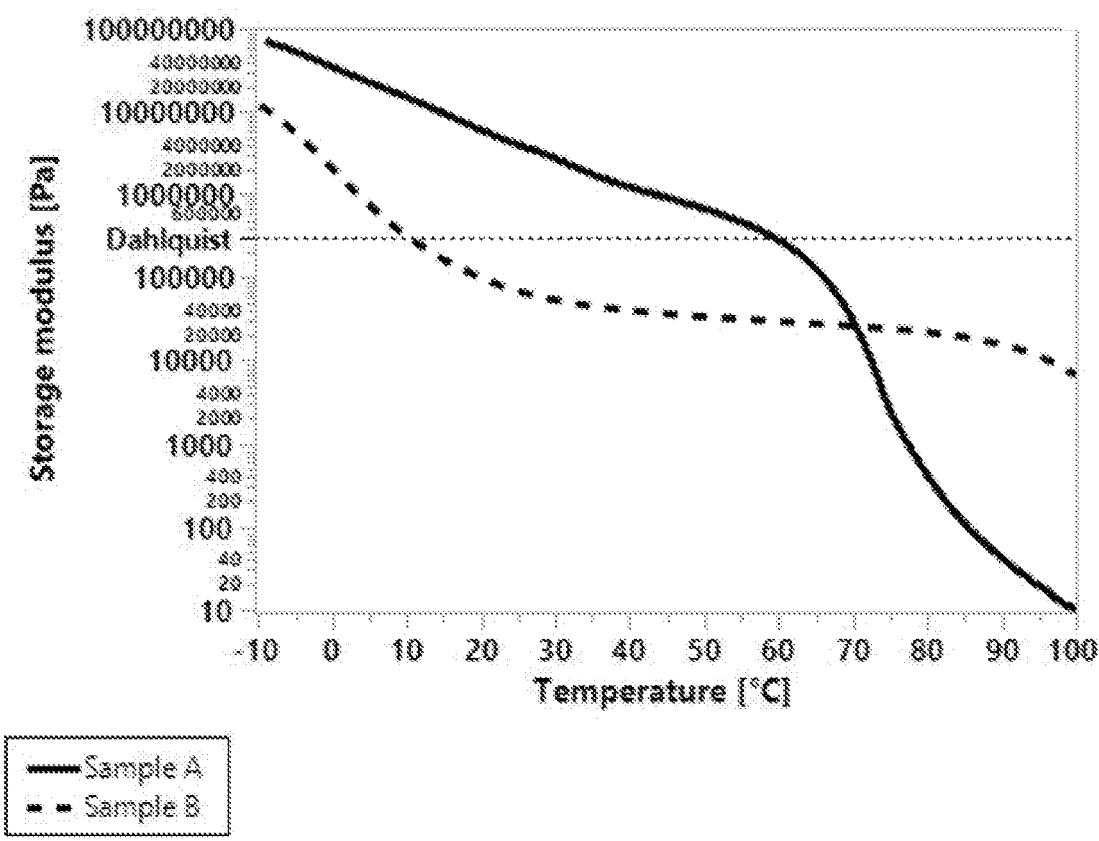
FIG. 6 is a graph showing storage modulus vs temperature for certain adhesives.

FIG. 6 plots storage modulus G', in a temperature range from −10° C. to 100° C., for two commercially available adhesives. Sample A was DM538, commercially available from Henkel. Sample A has a storage modulus G' which is above the Dahlquist criterion of 300,000 Pa between 20° C. and 50° C. Sample B was H2031F, commercially available from Bostik. Sample B has a storage modulus G' which is below the Dahlquist criterion between 20° C. and 50° C. Sample A represents a preferred adhesive for this application.

Alternatively, the attachment mechanism may comprise heat bonds, pressure bonds, ultrasonic bonds, dynamic mechanical bonds, or any other suitable attachment mechanisms or combinations of these attachment mechanisms known in the art.

It will be appreciated that the outer cover described above can be constructed of materials and construction so as to bear and sustain a majority of the structural loading generally imposed upon a disposable diaper, by stretching and accommodation of the wearer's anatomical features and body movements, and by absorption, swelling and added weight resulting from the wearer's exudations of waste. Thus, lesser requirements for structural strength of an insert might be present with use of such an outer cover, as compared with strength required of inside components of a disposable diaper. Therefore, an article such as described herein may include a disposable absorbent insert manufactured from materials that are different from those ordinarily used in the manufacture of disposable diapers, such as petroleum-derived materials, e.g., polyethylene and polypropylene. For example, a disposable absorbent insert having one or more of a topsheet, backsheet, and/or other components formed of products of wood, cotton, flax (linen), hemp, bamboo, or other cellulose fibers (e.g., paper), in addition to the materials identified above, is contemplated. If resistance to aqueous liquid penetration or substantial liquid impermeability is desired, e.g., for a backsheet, a material formed of ordinarily hydrophilic fibers such as paper may be coated or impregnated with a hydrophobic material, such as a skin-compatible oil or wax, to impart the desired resistance to aqueous liquid penetration. Each of the materials forming the insert may be selected so as to be dispersible in water or an aqueous solution, flushable, biodegradable and/or compostable (preferably to an agriculturally usable humus or soil amendment).

Absorbent Core

Referring to FIGS. 5A-G, insert 50 may have an absorbent core 71 within the envelope-like structure formed by topsheet 51 and backsheet 52. Absorbent core 71 may comprise any absorbent material which is generally compressible, conformable, non-irritating to the wearer's skin, and capable of absorbing and retaining liquids such as urine and other certain body exudates. Absorbent core 71 may comprise a wide variety of liquid-absorbent materials commonly used in disposable diapers and other absorbent articles such as comminuted wood pulp, which is generally referred to as airfelt. Examples of other suitable absorbent materials include creped cellulose wadding; coform comprising wood pulp and meltblown polymers; tissue, including tissue wraps and tissue laminates; absorbent foams; absorbent sponges; superabsorbent polymers; absorbent gelling materials; or any other known absorbent material or combinations of materials.

Absorbent core 71 may include liquid acquisition/distribution material 65, and storage material 66. Generally, acquisition/distribution material 65 may have comparatively rapid absorption and wicking properties, but also may have limited absorption capacity. Conversely, generally, storage material 66 may have comparatively slower absorption and wicking properties, but also may have greater absorption capacity. Thus, acquisition/distribution material 65 may serve to rapidly absorb and distribute gushes of liquid such as urine, while storage material 66, having greater absorption capacity, may serve to absorb such liquid from the acquisition/distribution material and store it for the time needed until the insert may be replaced.

Absorbent core 71 may be manufactured in a wide variety of sizes and shapes (e.g., rectangular, hourglass, "T"-shaped, etc.). The configuration and construction of absorbent core 71 may also be varied (e.g., the absorbent core(s) or other absorbent structure(s) may have varying caliper zones, hydrophilic gradient(s), a superabsorbent gradient(s), or lower average density and lower average basis weight acquisition zones; or may comprise one or more layers or structures). Examples of absorbent structures for use as absorbent core 71 may include those described in U.S. U.S. Pat. Nos. 4,610,678; 4,673,402; 4,834,735; 4,888,231; 5,137,537; 5,147,345; 5,342,338; 5,260,345; 5,387,207; and 5,625,222.

To reduce the overall size and/or thickness of the absorbent core, and thereby improve wearer comfort and reduce the volume of disposable waste created by a soiled insert, it may be desired to construct an absorbent core using the lowest volumes of core materials possible within performance constraints. Generally absorbent core constructions that minimize or eliminate the need for and inclusion of airfelt or other forms of cellulose fiber in combination with particles of superabsorbent polymer are referred to as "substantially airfelt-free cores". Airfelt and other cellulose fiber have been used as absorbent fillers in absorbent cores of disposable diapers. Such fiber possesses absorbent properties and imparts some absorption capacity to an absorbent core, but also is included to provide a structural matrix to hold dispersed particles of superabsorbent polymer and/or absorbent gelling material. While inclusion of such particles enhances absorption capacity, keeping such particles suitably dispersed may be important to prevent the particles from "gel-blocking" in use as they swell with absorbed liquid, causing loss of absorption capacity. The inclusion of airfelt or other cellulose fiber as a matrix for superabsorbent particles can serve to reduce or prevent gel-blocking. However, it also imparts bulk to an absorbent core, even before absorption of any liquids.

Figure 5A:
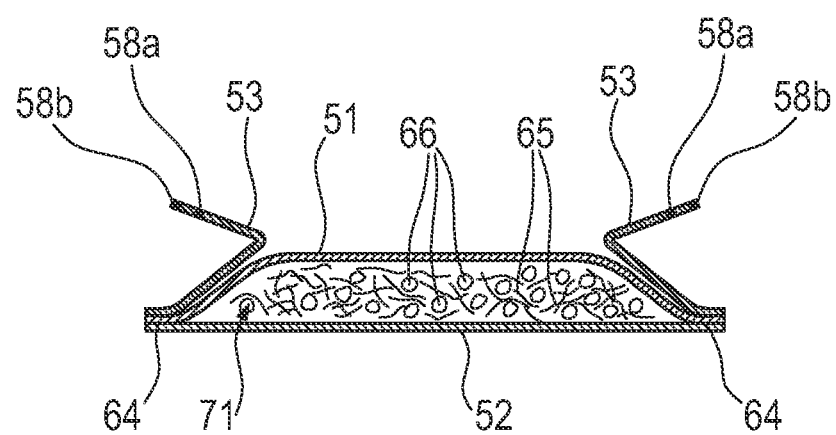
FIG. 5A is a cross sectional view of an example of an insert such as shown in FIG. 4, taken at line 5A-5A in FIG. 4.
Figure 5B:
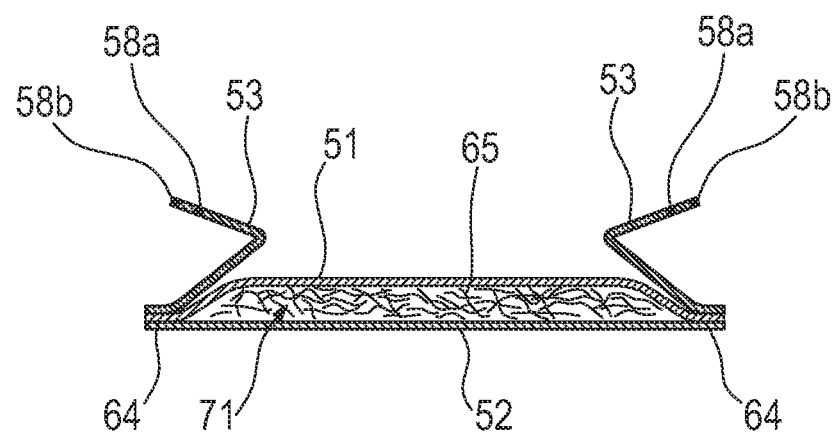
FIG. 5B is a cross sectional view of an example of an insert such as shown in FIG. 4, taken along line 5B-5B in FIG. 4.
Figure 5C:
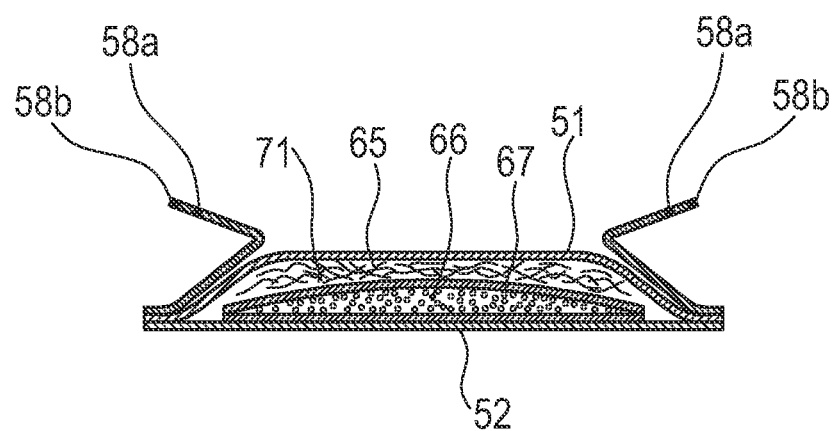
FIG. 5C is a cross sectional view of another example of an insert such as shown in FIG. 4, taken along line 5C-5C in FIG. 4.
Figure 5D:
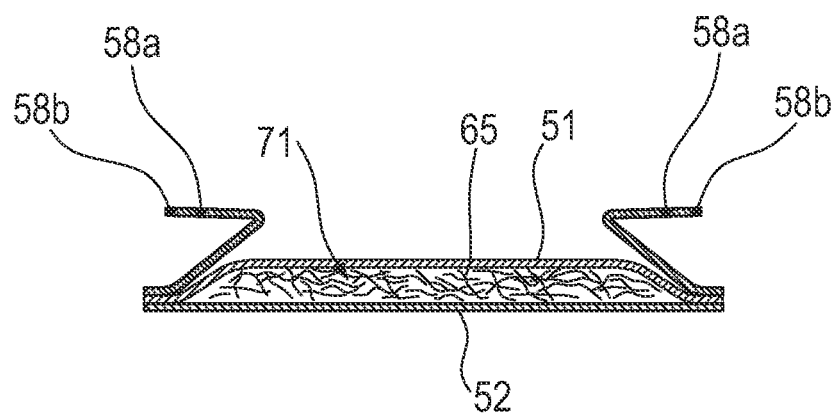
FIG. 5D is a cross sectional view of another example of an insert such as shown in FIG. 4, taken along line 5D-5D in FIG. 4.
Figure 5E:
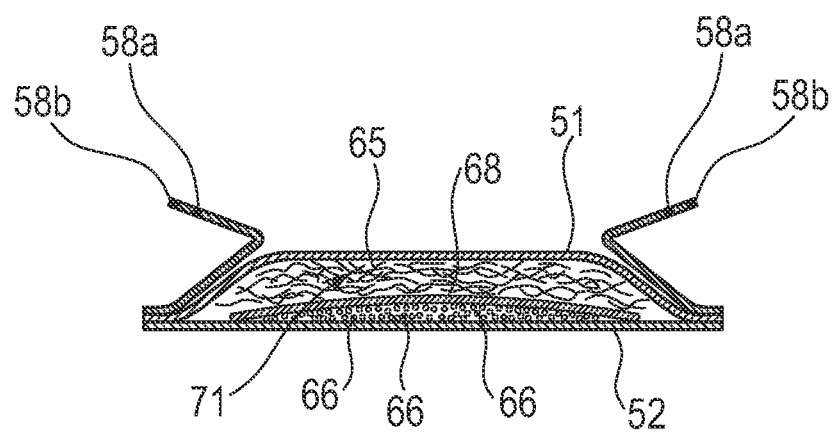
FIG. 5E is a cross sectional view of another example of an insert such as shown in FIG. 4, taken along line 5E-5E in FIG. 4.

Referring to the examples depicted in FIGS. 5C and 5E herein, an absorbent core 71 having a portion that is substantially airfelt-free may be disposed between the topsheet 51 and the backsheet 52. The core 71 may include a layer formed at least in part of a substrate, distributed absorbent particles 66 of a superabsorbent polymer or absorbent gelling material, and a thermoplastic adhesive composition capturing the distributed absorbent particles 66 and adhering to at least portions of the substrate, thereby immobilizing the absorbent particles 66 on or proximate to, and relative to, the substrate. The core may have channels, i.e. areas substantially free of absorbent materials, such as pulp and SAP. The % of cellulose based SAP as part of the cellulose/SAP mix, may be lower than 70%, lower than 50%, lower than 35%, lower than 25%: reducing the % of cellulose based SAP may be preferred for cellulose based SAP having reduced absorption performance under pressure.

Sublayer

Insert 50 may also include a sublayer disposed between topsheet 51 and backsheet 52. The sublayer may be any material or structure capable of accepting, storing or immobilizing bodily exudates. Thus, the sublayer may include a single material or a number of materials operatively associated with each other. Further, the sublayer may be integral with another element of insert 50 or may be one or more separate elements joined directly or indirectly with one or more elements of insert 50. Further, the sublayer may include a structure that is separate from the core 71 or may include or be part of at least a portion of the core 71.

Suitable materials for use as the sublayer may include large cell open foams, macro-porous compression resistant highloft nonwoven structures comprising a multiplicity of vertically oriented looped strands of fibers, absorbent core structures described above having punched holes or depressions, and the like. Further, the sublayer, or any portion thereof, may include or be coated with a lotion or other known substances to add, enhance or change the performance or other characteristics of the element.

Insert Asymmetry

Referring to FIG. 4, insert 50 will have an insert lateral axis 70 that equally divides its longitudinal length. Insert 50 may have a structure that is asymmetric across insert lateral axis 70. For purposes of this description, with used with respect to an insert, "asymmetric" and "asymmetry" mean that features, geometry (e.g., shape), materials and/or construction on one side of insert lateral axis 70 differ substantially in some respect from those on the other side of insert lateral axis 70. Such asymmetric construction results from having various features of insert 50 designed to accommodate the body features and functions of the intended wearer (i.e., body contours, excretory and eliminatory functions) as they differ front-to-rear, to enhance containment/absorbency performance, comfort, fit and/or appearance of the wearable absorbent article, to economize on use of materials and/or to reduce volume of disposable waste. "Asymmetric" and "asymmetry" do not refer to differences across the insert lateral axis that are attributable to features that may be included on an insert only for purposes of: purely cosmetic coloration or surface decoration; fastening to an outer cover (such as fastener components described herein); user grasping of the insert (such as a grasping structure described herein); as indicia for orienting an insert within an outer cover (such as orientation indicia described herein); or for other purposes substantially unrelated to the body features and functions of the intended wearer as they differ front-to-rear, to affect performance, comfort, fit and/or physical appearance of the wearable absorbent article, to economize on use of materials and/or to reduce volume of disposable waste.

As one example, topsheet 51 may have one or more apertures 63 therethrough, predominately in the crotch and/or rearward region 55 as suggested in FIG. 4. Apertures 63 can permit liquid or low viscosity fecal material to penetrate topsheet 51 and reach absorbent materials in absorbent core 71 more rapidly than would occur without such apertures, enhancing liquid feces absorption and containment capability of insert 50.

In another example, a feces management feature may be disposed in the rear of the article, including one or more pockets, spacers, low viscosity feces management elements, openings in suspended topsheets, and similar features, for example, as described in copending U.S. application Ser. Nos. 11/224,779, 11/786,890 and 11/894,087. Thus, topsheet 51 may comprise one or more larger apertures in the rear region to provide for unrestricted or comparatively less restricted movement of solid or higher viscosity waste therethrough. The size of an aperture may be important in achieving the desired fecal waste encapsulation performance. If the aperture is too small, the waste may not pass through the aperture, either due to poor alignment of the exudation point and the aperture location, or due to fecal masses having a size greater than the aperture. If the aperture is too large, however, the area of skin that may be exposed to "rewet" from the contained waste matter is increased.

An insert may have asymmetry in its absorbent core (absorbent core asymmetry). Absorbent core asymmetry may result from arrangement of materials and features within the absorbent core to locate particular materials and features of the absorbent core where they are most needed and/or most effective, in accordance with features and functions of wearer anatomy as they differ front-to-rear.

For example, all or a portion of the rearward region 55 of insert 50 may include acquisition/distribution material 71 but less or no storage material 66 as compared with forward region 54, as may be seen by comparison of FIGS. 5A and 5B, 5C and 5D, and 5E and 5F, respectively. By this particular absorbent core asymmetry, storage material 66 may be located predominately in the front of the wearable absorbent article when worn. This may provide a predominate proportion of the insert's urine storage capacity closer to the urine exudation point of the wearer to reduce the likelihood of leakage, and remove potentially uncomfortable and/or unsightly size and bulk from between the wearer's legs or the wearer's backside area, particularly relevant when storage material 66 becomes swollen with absorbed liquid. Additionally, this particular asymmetry provides for economization of the amount of storage material 66 used, by locating it in only a portion of the insert rather than substantially along the entire insert. The liquid storage capacity of the forward region of the absorbent core may be greater than that of the rearward region of the absorbent core as measured by the Teabag Centrifuge Capacity test disclosed in U.S. Pat. No. 6,278,037. The liquid storage capacity of the forward region of the absorbent core may be at least about 10%, 20%, 50%, or even 100% or more greater than that of the rearward region. With such an arrangement, acquisition/distribution material 65 located in both forward and rearward regions 54, 55 can serve to acquire and move liquid (usually, urine) to the storage material 66 located predominately in the forward region 54. Alternatively, or additionally, the area and/or basis weight of the acquisition system or component materials in the forward region of the insert may be at least about 10%, 20%, 50%, or even 100% or more greater than that of the rearward region. Alternatively, or additionally, the surface area, cross-sectional area and/or lateral width of absorbent core 71 may be greater in the forward region 54 as compared with the rearward region 55. For example, the surface area, cross-sectional area and/or lateral width of absorbent core 71 may be greater in the forward region 54 as compared with the rearward region 55, to accommodate a greater proportion of the acquisition/distribution and/or storage material present in the forward region of the absorbent core.

Figure 5F:
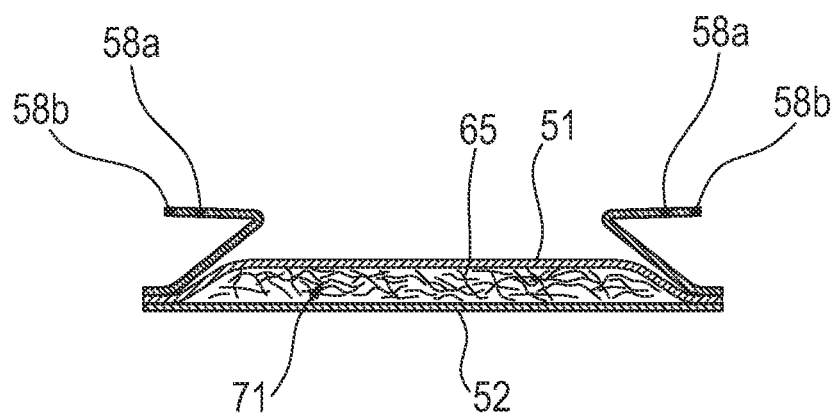
FIG. 5F is a cross sectional view of another example of an insert such as shown in FIG. 4, taken along line 5F-5F in FIG. 4.

Referring to FIGS. 5A, 5C and 5E, in other examples, absorbent material 66 in forward region 54 may be, respectively, dispersed within acquisition/distribution material 65 (FIG. 5A), contained within a separate liquid permeable structure or envelope 67 in fluid communication with acquisition/distribution material 65 (FIG. 5C); or dispersed on, or within an adherent matrix of, retaining material 68, and in fluid communication with acquisition/distribution material 65 (FIG. 5E). Conversely, the rearward region 55 may predominately contain acquisition/distribution material 65, but less storage material 66 as compared with forward region 54, or none (FIGS. 5B, 5D, 5F). Materials in forward region 54 also may be disposed according to construction described in one or more of U.S. Application Nos. US 2008/312617, US 2008/312618, US 2008/312619, US 2008/312620, US 2008/312621, US 2008/312622, US 2008/312623, US 2008/312624, US 2008/312625, and US 2008/312628, with a differing construction in rearward region 55.

In another example, storage material 66 and acquisition/distribution material 65 may occupy differing, distinct layers of absorbent core 71, as suggested by FIG. 5C. It may be desirable in some circumstances to make the layer containing acquisition/distribution material 65 larger in surface area (i.e., plan view surface area relative to the insert laid flat, as shown in FIG. 4) than the layer containing storage material 66, or vice versa. For example, if the layer containing acquisition/distribution material 65 is formed so as to have a larger surface area laterally across the insert in the forward region 54, this may serve to provide space for a greater quantity of acquisition/distribution material in the forward region. This may impart greater capacity in the forward region to rapidly absorb and distribute relatively large gushes of urine discharged toward the forward region, as may be desired for wearable absorbent articles for, e.g., older male babies and toddlers—enhancing containment capability of the insert.

Figure 5G:
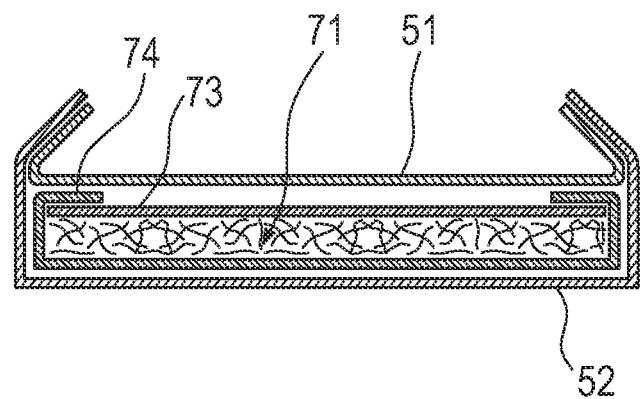
FIG. 5G is a cross sectional view of another example of an insert such as shown in FIG. 4, taken along lateral axis 70 in FIG. 4.

In another example, as shown in FIG. 5G, the absorbent core 71 is wrapped in core wrap 73, 74. The wrapped core is enveloped between topsheet 51 and backsheet 52. In one example the core wrap 73, 74 may be made of nonwoven paper, e.g. tissue paper; topsheet 51 and backsheet 52 may be made of regenerated cellulose, for example viscose.

In another example, however, such as for newborns and young babies, large gushes of urine might not be expected, but comparatively substantial quantities of liquid or low-viscosity fecal material may be. Thus, a wearable absorbent article for this group of intended wearers may include an acquisition/distribution layer of larger size, occupying a greater surface area, in the rearward region 55 of the insert. This may impart greater capacity in the rearward region to rapidly absorb gushes of liquid or low viscosity fecal material discharged toward the rearward region, and thereby enhance containment capability of the insert.

Differences between forward and rearward regions also may be included for purposes of sleep-use inserts. While an insert designed for awake-use may have the predominate proportion of its liquid-storage capacity in the forward region 54 as described above, an insert designed for sleep-use with, e.g., young babies, may have the predominate proportion of its liquid-storage capacity in the rearward region 55, to accommodate babies who sleep lying on their backs, by locating the predominate proportion of storage capacity where fluid exudates will flow under influence of gravity.

It also may be desired to dispose a thickening agent in the absorbent core in the rearward region 55 of the insert. A thickening agent may be useful for providing additional assurance that liquid or low viscosity fecal material will be thickened and thereby more immobilized, and more likely to be contained within the insert. The thickening agent may be biodegradable.

Insert 50 also may have overall shape/backsheet asymmetry. For example, viewed in a laid-flat position as shown in FIG. 4, insert 50 may occupy a larger surface area on one side of insert lateral axis 70 than on the other. This may be useful for purposes of comfort, body coverage, appearance, performance and/or economization in use of backsheet material(s). For example, in conjunction with including a predominate proportion of storage material 66, the forward region 54 of insert 50 may occupy a larger surface area, associated with a larger space within the insert to contain the storage material, e.g., so as to improve overnight absorption and containment capacity for wearers who sleep on their stomachs, and allow for the insert to remain flatter, particularly relevant when the absorbent material becomes swollen with absorbed liquid. Such larger surface area may be greater on one side of insert lateral axis 70 than the surface area occupied by the rearward region 55 on the other side of insert lateral axis 70.

Insert 50 also may have a narrowed region in the area which rests in the crotch region of the outer cover. This narrowing in the crotch region may serve to enhance wearer comfort by eliminating size and bulk between the legs. Referring to FIG. 2B, it may also serve to better enable the crotch region 26 of outer cover 20 to contain and maintain a laterally centered position of insert 50, by ensuring that insert 50, by having limited quantities of absorbent materials therein and limited width, does not swell beyond the space capacity of crotch region 26 of outer cover 20. Such narrowing may continue, for example, into the rear portion of the insert, thereby creating overall shape/backsheet asymmetry.

Insert 50 may also be asymmetrical across insert lateral axis 70 in other ways, to serve the same, related or other purposes as those described above.

It will be appreciated, therefore, that insert asymmetry across insert lateral axis 70 is a result of design and construction of the insert so as to have only one front region and only one rear region, i.e., the front and rear regions are not interchangeable, if the designed fit, comfort, performance and appearance of insert 50 are to be fully realized.

Grasp Structures

Referring to FIGS. 2F, 3 and 4, insert 50 also may include respective forward and rearward user grasp structures 59, 61. User grasp structures 59, 61 may be provided to enable the user to quickly and easily grasp insert 50 proximate its respective ends.

Grasp structures as shown and/or suggested may enable the user to more quickly grasp and stretch insert 50 from a contracted position similar to that depicted in FIG. 3, to an extended position similar to that depicted in FIG. 4, which may be desirable for installing insert 50 into an outer cover. If user grasp structures 59, 61 are centered proximate to the respective ends of insert 50 as shown, this may also provide visual assistance to the user for co-locating respective centered fastener component pairs, described in more detail below.

Additionally, user grasp structures 59, 61 may serve to enable the user to quickly and easily grasp insert 50 proximate to its respective ends, which as a result of their distance from exudation points on a wearer's body, are less likely to be soiled at the time replacement of insert 50 becomes necessary or desirable. Thus, the user may be better enabled to avoid contacting the wearer's exudates with the user's hands when removing a soiled insert 50 from an outer cover 20.

Referring to the example depicted in FIG. 2F, it may be desirable in some circumstances to include more than one grasp structure 59 on the insert. This may be deemed useful in examples such as depicted in FIG. 2F, where more than one fastener component 56 is disposed on an end of an insert. In such circumstances, including a separate grasp structure 59 associated with and proximate to each fastener component 56 may enable a user to manipulate portions of an insert to more easily accurately locate and install it within an outer cover with fastener components 59, 33 suitably co-located and/or aligned. It may also enable a user to more easily tug the fastener components 56 away from paired fastener components 33 to separate them, when it is necessary to remove the insert from the outer cover, by localizing or focusing the user's tugging forces where they are needed to effect such separation.

User grasp structures 59, 61 may include tab-like extensions as shown in FIGS. 2F, 3 and 4, with free ends unattached to the outer cover 20 when insert 50 is installed therein, which are easily graspable. User grasp structures may have different forms as well. By way of non-limiting example, user grasp structures may take the form of loop-like extensions (not shown) extending from the ends of insert 50, finger holes (not shown) through insert 50 proximate the ends thereof, pockets with openings facing the lateral centerline 70 of the insert, and other structures that facilitate grasping and pulling of insert 50 at locations proximate to its ends.

Additionally, grasp structures 59, 61 may be formed of materials having a high coefficient of friction (e.g., at least about 0.5), resiliently compressible materials and/or surfaces having three-dimensional relief, to facilitate secure gripping and pulling the insert by the user.

Grasp structures 59, 61 also may be configured or adapted so as can be folded over or under the respective ends of insert, toward the lateral centerline of the insert. This can serve to conceal the grasp structures behind other materials and protect them from contamination by bodily exudates. Alternatively or in addition, it can serve to add convenience for the user.

Insert/Outer Cover Fastener Components; Orientation Indicia; Other Possible Features Referring back to FIGS. 2B, 3 and 4, as previously noted, outer cover 20 may have one or more insert fastener components such as front and/or rear insert fastener components 33, 32 disposed thereon. Insert 50 may have front and/or rear fastener components 56, 57 disposed thereon. Respective front and/or rear fastener components 56, 57 on insert 50 may be selected and/or adapted to be cooperative to enable fastening with respective front and/or rear insert fastener components 33, 32 disposed on outer cover 20.

EXAMPLES

Example 1

The absorbent article was a two piece hybrid diaper, made of a reusable cloth diaper made by Charlie Banana, May 2021, and a disposable biodegradable insert. The disposable biodegradable insert was made by two equal laminates, glued to each other with 5 gsm spiral construction glue, 95 mm wide in CD and 350 mm long in MD.

The disposable insert comprised a CMC based AGM, Spongel®, commercially available from Magic S.r.L., Oleggio, Italy. The disposable biodegradable insert had about the total following composition: 7 g of Spongel®, 25 g of pulp fibers, 8.3 g of bamboo viscose spunlace, 1.8 g of pulp tissue and 0.6 g of glue. Each laminate, comprised in the disposable biodegradable insert, had same design structure as commercially available Charlie Banana disposable insert.

The above described two piece hybrid diaper was then used with babies in consumer test and subsequently processed according to an degradation process in presence of an enzymatic solution in a treatment apparatus.

The treatment apparatus was Kcook Multi CCL401WH, commercially available from Kenwood. This machine comprises a container, which can be detached from the main body of the machine and can be closed with a lid. The empty container weight is about 2120 g, without blade and without lid. The height of the container is 22 cm, while the inner diameter of the container is 21 cm. The Kcook machine allows to control the temperature of the solution and used inserts inside the container and the rotating speed of the blade. Schematic drawings of the apparatus are shown in FIG. 1A and of the blade in FIG. 1B.

The temperature was set to 50° C. and the rotating speed was set to the level/value of '4'. Three used disposable inserts were loaded in the bucket of the Kcook machine: 1 of them was loaded with both urine and faecal material while the other two were loaded only with urine. The total amount of urine and faecal material was about 302 g for the three used inserts. The three used disposable inserts were loaded into the bucket and 1350 g of enzymatic solution was added. The initial pH, before starting the treatment apparatus, was 5.0.

The enzymatic solution was made mixing
- 135 g of cellulase enzyme blend, commercially available from Sigma-Aldrich under trade name SAE0020-50ML
- 675 g of 0.5M buffer solution ph 5.0 Liquid, commercially available from Alfa Aesar by ThermoFisher GmbH
- and 540 g of deionized water.

The container was closed with the lid and the apparatus was started and operated for 32 hours. Every 8 hours the lid was opened to have a visual check of the status of degradation of the used inserts. At the end of the experiment, the machine was switched off and after 8 hours the content of the bucket was analyzed both visually and with the test method herein described. The pH was measured to be 4.8 at the end of the experiment.

Visually the three used inserts looked dissolved, with only some residual fibers present in the liquid. The extend of dissolution was quantified using a mesh of 20 mm size. The solution was poured from the container of Kcook machine through the 20 mm mesh. The mesh was pre-weighted prior to the operation of passing the solution through the mesh, to determine an initial weight, w0. After the operation of passing the solution through the mesh was completed, the mesh was left evaporating in the environment at 23° C., 50% RH till the weight was constant, hence the final weight wf was determined. The actual used insert mass remaining on the mesh wr was determined as wf-w0. The amount of the used insert remaining on the mesh (wr) was 1.0 g residue on 20 mm mesh.

Example 2

The same two piece hybrid diaper, as described in Example 1, was used, with the same disposable biodegradable insert. The above described two piece hybrid diaper was then used with babies in consumer test and subsequently processed according to a degradation process in presence of an enzymatic solution in a treatment apparatus. Three used disposable inserts were loaded in the bucket of the Kcook machine: one of them was loaded with both urine and faecal material while the other two were loaded only with urine. The total amount of urine and faecal material was about 291 g for the three used inserts. The treatment apparatus was Kcook Multi CCL401WH, as in Example 1. The three used inserts were loaded in the bucket of the treatment apparatus and 1350 g of enzymatic solution was added into the bucket. The initial pH, before starting the treatment apparatus, was 5.0. The enzymatic solution was made mixing 135 g of cellulase enzyme blend, commercially available from Sigma under trade name 3AE0020-50ML.

1215 g of 0.1M buffer solution pH 5.0 Liquid, commercially available from Merck KGaA Once the three used inserts and the 1350 g of enzymatic solution were loaded into the bucket of the Kcook apparatus, the bucket was closed with the lid and the apparatus was started and operated for a total a 16 hours. After 8 hours the lid was opened to have a visual check of the status of degradation of the used inserts at which time significant pieces of materials were undegraded and still present in the solution in the bucket. This remained the case when the experiment was stopped after 16 hours. The pH was measured at 5.85 at the end of the experiment.

Without being bound to theory, it is believed that the mixing of urine and faecal material leads to formation of ammonia and increase of pH to a level no longer optimal for the enzyme. This supports the finding in Example 1 that the increased molarity of the pH buffer has led to better control of the pH and better degradation of the used absorbent article inserts.

Oscillatory Rheometry Test Method

The Oscillatory Rheometry Test Method is used to measure the Storage Modulus G' of a hot melt adhesive or a polymer composition at temperatures of interest. A controlled-stress rotational rheometer (such as Discovery HR-3, TA Instruments, New Castle, DE, USA, or equivalent) capable of sample temperature control (using a Peltier cooler and resistance heater combination) with a precision equal to or exceeding 0.5° C. over at least the range of −10° C. to 150° C. The rheometer is operated in a parallel plate configuration with 20-mm stainless steel parallel-plate tooling.

A parallel plate gap of 1000 µm is initially used in the method. To compensate for thermal expansion of the tooling, the gap is set to 1000 µm, and a mapping of actual plate gap (as measured using a suitable standard test fluid) a function of temperature over the range −10° C. to 150° C. is performed. This mapping is then used throughout the determination of the Storage Modulus at temperatures of interest.

The rheometer is heated to 150° C., the adhesive or polymer composition is introduced in the rheometer, the gap is set to 1050 µm, excess protruding sample is trimmed, and the gap is then set to 1000 µm. The axial force control of the rheometer is set to 0 N and be maintained within ±0.1 N of force during the experiment, thereby thermal expansion/contraction of the sample itself is compensated by adjusting the gap in order to avoid overfilling or underfilling in addition to the abovementioned compensation of the tooling. The rheometer is then allowed to cool to 130° C., at which point the measurement commences with temperature ramped from 130° C. to −10° C. at a constant rate of cooling of 2° C./min (hot to cold temperature ramp). The applied strain amplitude is 0.1%, and the frequency of oscillation is 1 Hz (that is, one cycle per second). The resulting oscillatory stress is recorded.

After this step, the sample temperature is set to 23° C. (temperature is ramped to this setpoint at a rate of 10° C./min), and the sample is allowed to rest for 4.0 hours at 23° C. At the end of this period, the temperature is set to −10° C. (temperature is ramped to this setpoint at a rate of 10° C./min), the sample is equilibrated for 300 seconds at −10° C., and a second oscillatory rheology measurement is conducted (0.1% strain, frequency of oscillation of 1 Hz) while temperature is ramped upward to 130° C. at a constant rate of increase of 2° C./min (cold to hot temperature ramp). The applied strain amplitude is 0.1%, and the frequency of oscillation is 1 Hz (that is, one cycle per second). The resulting oscillatory stress is recorded. For each sample two replicates are done.

From the second increasing temperature ramp (cold to hot) the arithmetic mean storage modulus G' of the two replicates at each of 20° C. and 50° C. is calculated and recorded, and these values are reported in Pascals (Pa) to the nearest 1 Pa as the Storage Modulus at 20° C. and Storage Modulus at 50° C., respectively.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process of enzymatic degradation of an absorbent structure, the absorbent structure being suitable for providing an absorbent core of a hygiene article, wherein the process comprises the step of contacting the absorbent structure with a solution comprising enzymes;
   wherein the absorbent structure comprises a superabsorbent polymer;
   wherein the superabsorbent polymer comprises polysaccharide, wherein the absorbent structure is partly or fully enveloped by a core wrap, and wherein the core wrap comprises regenerated cellulosic fibres.

2. The process according to claim 1, wherein the polysaccharide comprises a cellulose-based polymer and wherein the enzyme solution comprises glycoside hydrolase.

3. The process according to claim 2, wherein the cellulose-based polymer is carboxymethyl cellulose.

4. The process according to claim 2, wherein the superabsorbent polymer comprises at least about 90% by weight, or at least about 95% by weight, and or at least about 99% by weight of the cellulose-based polymer.

5. The process according to claim 1, wherein the polysaccharide comprises a starch-based polymer and wherein the enzyme solution comprises amylase.

6. The process according to claim 1, wherein the absorbent structure comprises less than about 1% by weight of acrylic polymer.

7. The process according to claim 1, wherein the absorbent structure further comprises wood pulp.

8. The process according to claim 1, wherein the regenerated cellulosic fibres comprise viscose.

9. The process according to claim 1, wherein the regenerated cellulosic fibres have an average fibre thickness of less than about 7 micrometers.

10. The process according to claim 1, wherein the enzymatic solution further comprises peroxide.

11. The process according to claim 1, wherein the enzymatic solution further comprises an antifoaming agent.

12. The process according to claim 1, wherein the pH is maintained between about 3.8 and about 6.5.

13. The process according to claim 1, wherein the absorbent structure comprises one or more adhesives and wherein at least one of the adhesives has a storage modulus, G', measured at 1 Hz and 50° C. according to the Oscillatory Rheometry Test Method, of greater than 300,000 Pa.

14. The process according to claim 1, wherein the absorbent structure is at least partly liquified by contacting the absorbent structure with the enzymatic solution and the liquified waste is discharged into municipal sewage system.

* * * * *